United States Patent
Vivanco

(10) Patent No.: US 9,923,836 B1
(45) Date of Patent: Mar. 20, 2018

(54) SYSTEMS AND METHODS FOR CONFIGURING A DELAY BASED SCHEDULER FOR AN ACCESS NODE

(71) Applicant: Sprint Spectrum LP, Overland Park, KS (US)

(72) Inventor: Daniel Vivanco, Sterling, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 161 days.

(21) Appl. No.: 14/550,150

(22) Filed: Nov. 21, 2014

(51) Int. Cl.
*H04L 12/875* (2013.01)
*H04L 12/859* (2013.01)
*H04L 12/823* (2013.01)
*H04L 12/801* (2013.01)

(52) U.S. Cl.
CPC ............ *H04L 47/564* (2013.01); *H04L 47/11* (2013.01); *H04L 47/2475* (2013.01); *H04L 47/32* (2013.01); *H04L 47/12* (2013.01)

(58) Field of Classification Search
CPC ......... H04L 12/26; H04L 47/10; H04L 47/12; H04L 47/2425; H04L 47/193; H04L 47/2466; H04L 12/5693; H04L 47/35; H04L 1/0079; H04L 1/0056; H04L 47/564; H04L 47/2475; H04L 47/32; H04L 47/11
USPC ......................................................... 370/230
See application file for complete search history.

(56) References Cited

U.S. PATENT DOCUMENTS

| 6,625,118 | B1* | 9/2003 | Hadi Salim | H04L 12/5602 370/229 |
| 7,050,393 | B2* | 5/2006 | Brown | H04L 47/26 370/229 |
| 7,768,923 | B2 | 8/2010 | Kumar et al. | |
| 8,411,561 | B2* | 4/2013 | Schliwa-Bertling | H04L 47/10 370/229 |
| 8,804,508 | B1* | 8/2014 | Hobbs | H04N 21/2402 370/230 |
| 8,948,009 | B1* | 2/2015 | Hasan | H04L 47/193 370/231 |
| 9,106,552 | B2* | 8/2015 | Babiarz | H04L 29/06027 |
| 2004/0192312 | A1* | 9/2004 | Li | H04L 1/16 455/445 |
| 2006/0045011 | A1* | 3/2006 | Aghvami | H04L 47/10 370/230 |
| 2006/0268713 | A1* | 11/2006 | Lundstrom | H04L 47/10 370/235 |
| 2007/0201365 | A1* | 8/2007 | Skoog | H04L 47/10 370/230.1 |

(Continued)

*Primary Examiner* — Un C Cho
*Assistant Examiner* — Shah Rahman

(57) ABSTRACT

Systems and methods are described for configuring a delay based scheduler for an access node. A plurality of packets may be received at an access node, where at least a first packet is associated with an application running on a wireless device in communication with the access node. The plurality of packets may be inspected to determine that one or more of the packets associated with the application are marked, where the mark indicates network congestion. A remaining time for the first packet may be calculated based on a packet delay budget associated with the running application and the determination that one or more of the packets associated with the application are marked. The first packet may then be scheduled for transmission to the wireless device, using a delay based scheduler, based on the calculated remaining time.

14 Claims, 5 Drawing Sheets

(56) References Cited

U.S. PATENT DOCUMENTS

| | | | |
|---|---|---|---|
| 2008/0091766 A1* | 4/2008 | Briscoe | H04L 12/5602 709/202 |
| 2008/0304413 A1* | 12/2008 | Briscoe | H04L 69/16 370/235 |
| 2008/0304416 A1* | 12/2008 | Fodor | H04L 47/10 370/237 |
| 2010/0274871 A1* | 10/2010 | Harrang | H04L 1/0002 709/217 |
| 2011/0158096 A1* | 6/2011 | Leung | H04L 1/0079 370/232 |
| 2011/0170408 A1* | 7/2011 | Furbeck | H04L 47/10 370/230 |
| 2011/0170410 A1* | 7/2011 | Zhao | H04L 47/10 370/232 |
| 2011/0222406 A1* | 9/2011 | Persson | H04L 47/12 370/236 |
| 2013/0077503 A1 | 3/2013 | Chaudhuri et al. | |
| 2013/0188562 A1* | 7/2013 | Espina Perez | H04L 1/188 370/328 |
| 2013/0298170 A1* | 11/2013 | ElArabawy | H04W 28/0231 725/62 |
| 2014/0133296 A1* | 5/2014 | Johansson | H04W 72/1252 370/230 |
| 2014/0185575 A1* | 7/2014 | Morioka | H04W 72/1268 370/329 |
| 2014/0211625 A1* | 7/2014 | White | H04L 69/16 370/235 |
| 2015/0180782 A1* | 6/2015 | Rimmer | H04L 49/70 370/236 |
| 2015/0244635 A1* | 8/2015 | Orten | H04W 28/021 370/230 |
| 2016/0057065 A1* | 2/2016 | Briscoe | H04L 47/624 370/235 |
| 2016/0135079 A1* | 5/2016 | Synnergren | H04W 28/10 370/230 |
| 2016/0219088 A1* | 7/2016 | Ma | H04L 65/605 |

* cited by examiner

SYSTEMS AND METHODS FOR CONFIGURING A DELAY BASED SCHEDULER FOR AN ACCESS NODE

TECHNICAL BACKGROUND

Telecommunication systems, such as cellular networks or other wireless networks, use various network links throughout the network to communicate. For example, an access node may use a network link to communicate with another access node while using a separate network link to communicate with another processing node. Accordingly, the system may rely on a well-established network to provide efficient communication services.

In certain circumstances, a portion of the network may experience high load (e.g., load above a threshold). For example, a communication link may experience a large amount of data traffic and the data transmitted over the communication link may be delayed as a result. Accordingly, a system that effectively balances load and considers delay may be able to provide a high quality service to users of the system.

Overview

Systems and methods are described for configuring a delay based scheduler for an access node. A plurality of packets may be received at an access node, where at least a first packet is associated with an application running on a wireless device in communication with the access node. The plurality of packets may be inspected to determine that one or more of the packets associated with the application are marked, where the mark indicates network congestion. A remaining time for the first packet may be calculated based on a packet delay budget associated with the running application and the determination that one or more of the packets associated with the application are marked. The first packet may then be scheduled for transmission to the wireless device, using a delay based scheduler, based on the calculated remaining time.

DETAILED DESCRIPTION

Figure 1:
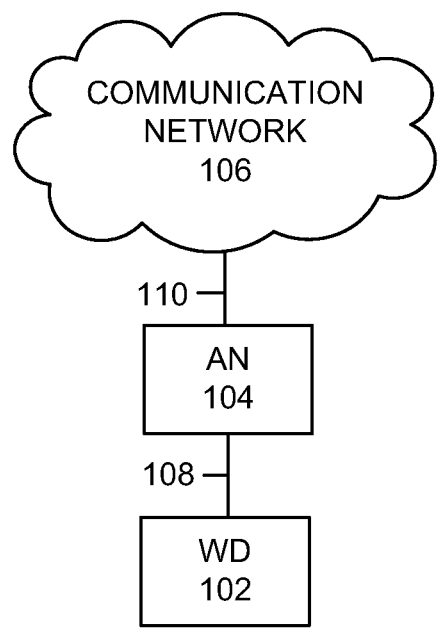
FIG. 1 illustrates an exemplary communication system to configure a delay based scheduler for an access node.

FIG. 1 illustrates an exemplary communication system 100 to configure a delay based scheduler for an access node comprising wireless devices 102, access node 104, communication network 106, and communication links 108 and 110. Other network elements may be present in the communication system 100 to facilitate communication but are omitted for clarity, such as controller nodes, base stations, base station controllers, gateways, mobile switching centers, dispatch application processors, and location registers such as a home location register or visitor location register. Furthermore, other network elements may be present to facilitate communication between access node 104 and communication network 106 which are omitted for clarity, including additional processing nodes, routers, gateways, and physical and/or wireless data links for carrying data among the various network elements.

Wireless device 102 can be any device configured to communicate over communication system 100 using a wireless communication link. For example, wireless device 102 can include a cell phone, a smart phone, a computing platform such as a laptop, palmtop, or a tablet, a personal digital assistant, or an internet access device, and combinations thereof. It is noted that while one wireless device is illustrated in FIG. 1 as being in communication with access node 104, any number of wireless devices can be implemented.

Access node 104 is a network node capable of providing wireless communications to wireless device 102, and can be, for example, a base transceiver station, a radio base station, and an eNodeB device. Access node 104 may communicate with communication network 106 over communication link 110. Although only access node 104 is illustrated in FIG. 1, wireless device 102 (and other wireless devices not depicted) can be in communication with a plurality of access nodes and/or small cells. The plurality of access nodes and/or small cells can be associated with different networks and can support different communication protocols and radio access technologies.

Communication network 106 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 106 can be capable of carrying voice information and other information, for example, to support communications by a wireless device such as wireless device 102. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, and Third Generation Partnership Project Long Term Evolution (3GPP LTE). Wired network protocols that may be utilized by communication network 106 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 106 may also comprise a wireless network, including base stations, wireless communication nodes, telephony switches, internet routers, network gateways, computer systems, communication links, or some other type of communication equipment, and combinations thereof.

Communication links 108 and 110 can be wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, GSM, CDMA, UMTS, HSPA, EV-DO, or 3GPP LTE, or combinations thereof. Other wireless protocols can also be used.

In an embodiment, system 100 may use a plurality of carriers in order to provide wireless communication services. A plurality of carriers that comprise bandwidth for wireless communications (e.g., 1.25 GHz carrier, 1900 Mhz carrier, and 800 Mhz carrier, and the like) may include a plurality of channels (e.g., 5 Mhz channels, 10 Mhz channels, 15 Mhz channels, and the like) that may further be divided into subcarriers. In an embodiment, a frequency band may comprise a carrier, a channel, a subcarrier, a plurality of any of these, or any other suitable frequency band.

In operation, access node 104 may establish communication with wireless device 102 such that access node 104 provides the wireless device access to a communication network (e.g., communication network 106). Access node 104 may schedule transmissions (e.g., physical resource block transmissions) to wireless devices in communication with the access node using a delay based scheduler. For example, a packet may be received at access node 104 that is associated with wireless device 102, and access node 104 may use a delay based scheduler to schedule transmissions to wireless device 102 to communicate the data from the received packet.

In an embodiment, the delay based scheduler may consider the age of a packet received at access node 104. For example, packets received at access node 104 may be time stamped and queued in a buffer for transmission. For each packet in the queue, a packet delay (time difference between the current time and the arrival time of a packet) may be computed. The packets may then be transmitted to wireless devices in communication with access node 104 based on a packet delay budget. A packet delay budget may comprise a tolerable delay for a data packet that may be based on the application associated with the data packet or a service associated with the data packet (e.g., streaming video).

In an embodiment, the remaining time for a packet ($d_i(t)$), may be calculated as shown: $d_i(t)=T_i-W_{i,t}$, where $T_i$ may be the packet delay budget and $W_{i,t}$ may be the packet delay for the packet based on the timestamp. In an example, a user with the lowest calculated $d_i(t)$ may be scheduled the next transmission by access node 104.

In an embodiment, a packet received at access node 104 may have already experienced delay based on congestion in a network (e.g., communication network 106 and/or other networks comprising the end to end connection between wireless device 102 and the device communicating with wireless device 102). For example, a plurality of packets may be received at access node 104, where some of the packets may have experienced a greater delay than others. Accordingly, a system that considers a delay to packets when scheduling transmissions may provide enhanced wireless service to users of the system.

Systems and methods are described for configuring a delay based scheduler for an access node. A plurality of packets may be received at an access node, where at least a first packet is associated with an application running on a wireless device in communication with the access node. The plurality of packets may be inspected to determine that one or more of the packets associated with the application are marked, where the mark indicates network congestion. A remaining time for the first packet may be calculated based on a packet delay budget associated with the running application and the determination that one or more of the packets associated with the application are marked. The first packet may then be scheduled for transmission to the wireless device, using a delay based scheduler, based on the calculated remaining time.

Figure 2:
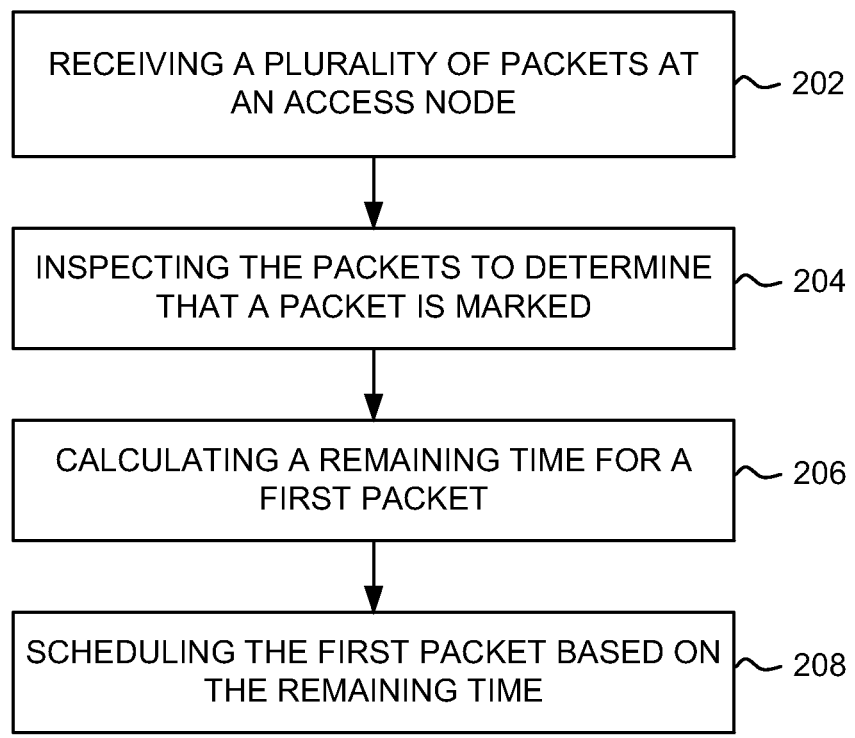
FIG. 2 illustrates an exemplary method for configuring a delay based scheduler for an access node.

FIG. 2 illustrates an exemplary method for configuring a delay based scheduler for an access node. The method will be discussed with reference to the exemplary communication system 100 illustrated in FIG. 1, however, the method can be implemented with any suitable communication system.

Referring to FIG. 2, at step 202, a plurality of packets may be received at an access node, wherein at least a first packet may be associated with an application running on a wireless device in communication with the access node. For example, access node 104 may be in communication with wireless device 102, and an application may be running on wireless device 102 that communicates with access node 104. A plurality of packets may be received at access node 104, where at least a first packet may be associated with the application running on wireless device 102. The application may be, for example, a web browser, a voice application (e.g., voice over IP application), a streaming video application, and the like.

At step 204, the plurality of packets may be inspected to determine that one or more of the packets associated with the application are marked, wherein the mark may indicates network congestion. For example, the plurality of packets received at access node 104 may be inspected to determine that one or more of the packets associated with the application running on wireless device 102 are marked. In an embodiment, the marking may indicate network congestion over the network that carried the marked packet.

At step 206, a remaining time may be calculated for the first packet based on a packet delay budget associated with the running application and the determination that one or more of the packets associated with the application are marked. For example, a packet delay budget may be associated with the application running on wireless device 102. A remaining time may be calculated for the first packet based on the packet delay budget associated with the application and the determination that one or more of the packets associated with the application were marked (e.g., marked indicating network congestion over the network that carried the one or more packets).

At step 208, the first packet may be scheduled for transmission to the wireless device based on the calculated time remaining. For example, the first packet may be scheduled for transmission from access node 104 to wireless device 102 based on the calculated time remaining for the first packet. The scheduled transmission for the first packet may comprise one or more physical resource blocks scheduled for transmission.

Figure 3:
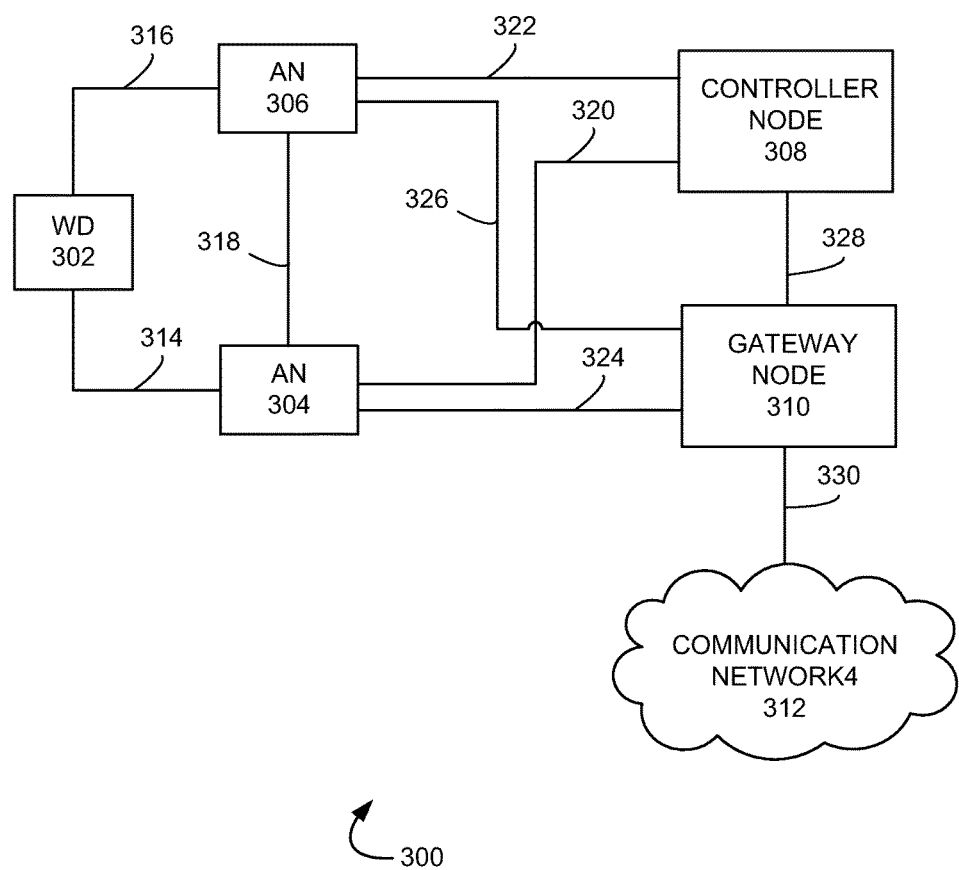
FIG. 3 illustrates another exemplary system to configure a delay based scheduler for an access node.

FIG. 3 illustrates another exemplary communication system 300 to configure a delay based scheduler for an access node. Communication system 300 may comprise wireless device 302, access node 304 and 306, controller node 308, gateway node 310, communication network 312, and communication links 314, 316, 318, 320, 322, 324, 326, 328, and 330. Other network elements may be present in the communication system 300 to facilitate communication but are omitted for clarity, such as base stations, base station controllers, gateways, mobile switching centers, dispatch application processors, and location registers such as a home location register or visitor location register.

Wireless device 302 can be any device configured to communicate over communication system 300 using a wireless communication link. For example, wireless device 302 can include a cell phone, a smart phone, a computing platform such as a laptop, palmtop, or a tablet, a personal digital assistant, or an internet access device, and combinations thereof.

Access nodes 304 and 306 are network nodes capable of providing wireless communications to wireless device 302, and can be, for example, a base transceiver station, a radio base station, or an eNodeB device. In an embodiment, access node 304 can comprise a serving access node for wireless device 302. Access nodes 304 and 306 may communicate with controller node 308 over communication links 320 and 322, respectively, and with gateway node 310 over communication links 324 and 326, respectively. Access nodes 304 and 306 may also communicate directly with each other over communication link 318.

Controller node 308 can be any network node configured to manage services within system 300. Controller node 308 may provide other control and management functions for system 300. The controller node 308 can be a single device having various functions or a plurality of devices having differing functions. For example, controller node 308 can include at least one of a multi-cell/multicast coordination entity (MCE), a mobility management entity (MME), a mobile switching center (MSC), a radio network controller (RNC), and a combination thereof.

Controller node 308 can comprise a processor and associated circuitry to execute or direct the execution of computer-readable instructions to obtain information. Controller node 308 can retrieve and execute software from storage, which can include a disk drive, a flash drive, memory circuitry, or some other memory device, and which can be local or remotely accessible. The software may comprise computer programs, firmware, or some other form of machine-readable instructions, and may include an operating system, utilities, drivers, network interfaces, applications, or some other type of software, including combinations thereof. Controller node 308 can receive instructions and other input at a user interface. Controller node 308 can comprise a processor and associated circuitry to execute or direct the execution of computer-readable instructions to obtain information.

Gateway node 310 is a network element which can comprise a processor and associated circuitry to execute or direct the execution of computer-readable instructions. Gateway node 310 may retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. In an embodiment, gateway node 310 can provide instructions to access nodes 304 and 306 related to channel selection in communications with wireless device 302. For example, gateway node 310 can comprise at least one of a serving gateway (SGW), a packet data network gateway (PDNGW), a cellular gateway (CGW), and a combination thereof.

Communication network 312 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 312 may also comprise base stations, wireless communication nodes, telephony switches, internet routers, network gateways, computer systems, communication links, or some other type of communication equipment, and combinations thereof. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, and Third Generation Partnership Project Long Term Evolution (3GPP LTE). Wired network protocols that may be utilized by communication network 312 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM).

Communication links 314, 316, 318, 320, 322, 324, 326, 328, and 330 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), or Long Term Evolution (LTE), or combinations thereof. Other wireless protocols can also be used.

Other network elements may be present in the communication system 300 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication among access nodes 304 and 306, controller node 308, gateway node 310, and communication network 312 which are omitted for clarity, including additional processing nodes, routers, gateways, and physical and/or wireless data links for carrying data among the various network elements. In an embodiment, any of controller node 308, gateway node 310, and one or more modules of access nodes 304 and/or 306 may perform all or parts of the methods of FIGS. 2 and 4.

In an embodiment, system 300 may use a plurality of carriers in order to provide wireless communication services. A plurality of carriers that comprise bandwidth for wireless communications (e.g., 1.25 GHz carrier, 1900 Mhz carrier, and 800 Mhz carrier, and the like) may include a plurality of channels (e.g., 5 Mhz channels, 10 Mhz channels, 15 Mhz channels, and the like) that may further be divided into subcarriers. In an embodiment, a frequency band may comprise a carrier, a channel, a subcarrier, a plurality of any of these, or any other suitable frequency band.

In operation, access node 304 may establish communication with wireless device 302 such that access node 304 provides the wireless device access to a communication network (e.g., communication network 312). Access node 304 may schedule transmissions (e.g., physical resource block transmissions) to wireless devices in communication with the access node using a delay based scheduler. For example, a packet may be received at access node 304 that is associated with wireless device 302, and access node 304 may use a delay based scheduler to schedule transmissions to wireless device 302 to communicate the data from the received packet.

In an embodiment, the delay based scheduler may consider the age of a packet received at access node 304. For example, packets received at access node 304 may be time stamped and queued in a buffer for transmission. For each packet in the queue, a packet delay (time difference between the current time and the arrival time of a packet) may be computed. The packets may then be transmitted to wireless devices in communication with access node 304 based on a packet delay budget. A packet delay budget may comprise a tolerable delay for a data packet that may be based on the application associated with the data packet or a service associated with the data packet (e.g., streaming video).

In an embodiment, the remaining time for a packet ($d_i(t)$), may be calculated as shown: $d_i(t)=T_i-W_{i,t}$, where $T_i$ may be the packet delay budget and $W_{i,t}$ may be the packet delay based on the time stamp for the packet. In an example, a user with the lowest calculated $d_i(t)$ may be scheduled the next transmission by access node 304.

In an embodiment, a packet received at access node 304 may have already experienced delay based on congestion in a network (e.g., communication network 312 and/or other networks comprising the end to end connection between wireless device 302 and the device communicating with wireless device 302). For example, a plurality of packets may be received at access node 304, where some of the packets may have experience a greater delay than others. Accordingly, a system that considers a delay to packets when scheduling transmissions may provide enhanced wireless service to users of the system.

Systems and methods are described for configuring a delay based scheduler for an access node. A plurality of packets may be received at an access node, where at least a first packet is associated with an application running on a wireless device in communication with the access node. The plurality of packets may be inspected to determine that one or more of the packets associated with the application are marked, where the mark indicates network congestion. A remaining time for the first packet may be calculated based on a packet delay budget associated with the running application and the determination that one or more of the packets associated with the application are marked. The first packet may then be scheduled for transmission to the wireless device, using a delay based scheduler, based on the calculated remaining time.

Figure 4:
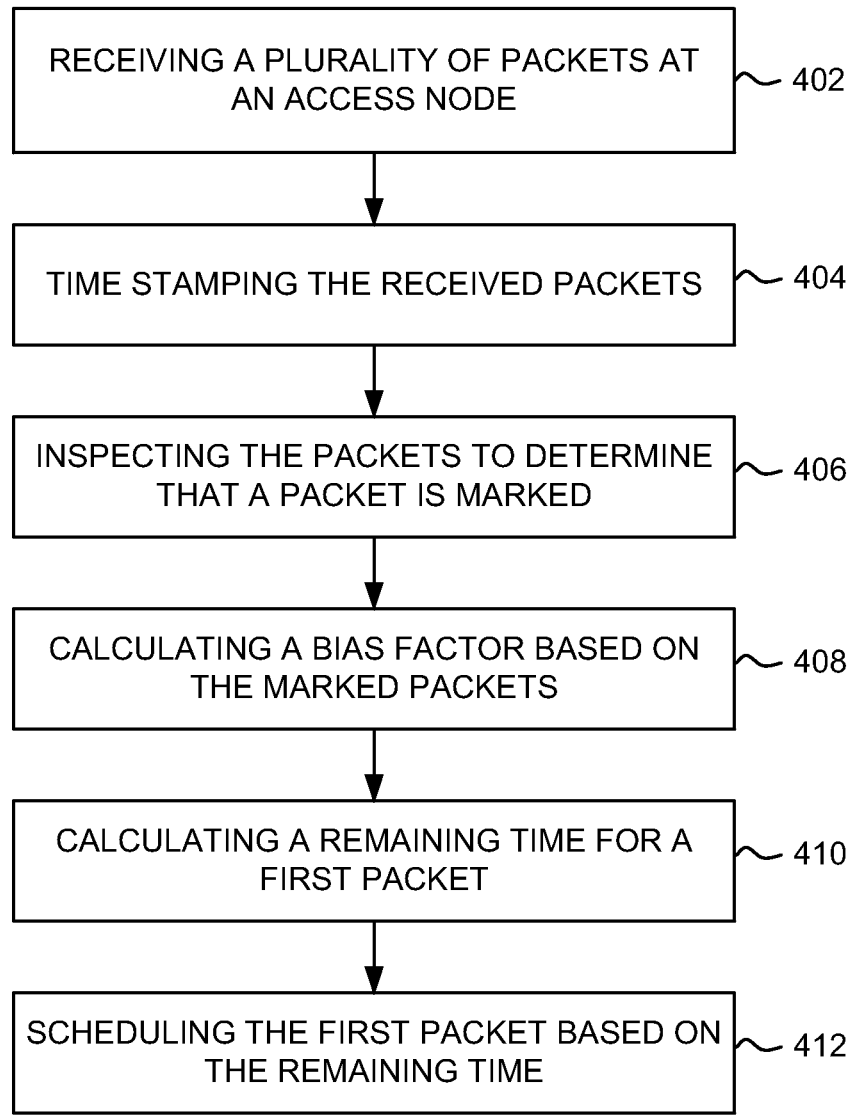
FIG. 4 illustrates another exemplary method of configuring a delay based scheduler for an access node.

FIG. 4 illustrates an exemplary method for configuring a delay based scheduler for an access node. The method will be discussed with reference to the exemplary communication system 300 illustrated in FIG. 3, however, the method can be implemented with any suitable communication system.

Referring to FIG. 4, at step 402, a plurality of packets may be received at an access node, wherein at least a first packet may be associated with an application running on a wireless device in communication with the access node. For example, access node 304 may be in communication with wireless device 302, and an application may be running on wireless device 302 that communicates with access node 304. A plurality of packets may be received at access node 304, where at least a first packet may be associated with the application running on wireless device 302. For example, the first packet may be transmitted to the application running on wireless device 302 by a network attached device in communication with wireless device 302 (e.g., a server). The application may be, for example, a web browser, a voice application (e.g., voice over IP application), a streaming video application, and the like.

In an embodiment, an application, such as a streaming video application, may be running on wireless device 302. The streaming video application may communicate with a network attached device (e.g., a streaming video server) over the Internet. Accordingly, wireless device 302 may communicate with access node 304, and subsequently connect to communication network 312, such that the streaming video application running on wireless device 302 may communicate with the network attached device (e.g., streaming video server). In this example, access node 304 may receive a plurality of packets from various devices (e.g., transmitted to one of a plurality of wireless devices in communication with access node 304), where the plurality of packets may include packets from the streaming video server transmitted to the streaming video application (e.g., running on wireless device 302). One of the packets from the streaming video server transmitted to the streaming video application may comprise the first packet.

At step 404, the plurality of packets received at the access node may be time stamped. For example, the plurality of packets received at access node 304 may be time stamped at their arrival. In this example, the first packet may be included in the time stamped packets. The time stamped packets may then be added to a buffer and await scheduling for transmission.

At step 406, the plurality of packets may be inspected to determine that one or more of the packets associated with the application are marked, wherein the mark may indicate network congestion. For example, the plurality of packets received at access node 104 may be inspected to determine that one or more of the packets associated with the application running on wireless device 302 are marked. In an embodiment, the marking may indicate network congestion over the network that carried the marked packet.

In an embodiment, a marked packet may comprise an Explicit Congestion Notification (ECN) marking. In this example, a network that marks a packet using an ECN marking may implement Active Queue Management (AQM). Such a network may communicate using a Transmission Control Protocol (TCP), a Real-Time Transport (RTP) or RTP Control (RTCP) over Universal Datagram Protocol (UDP), or any other suitable protocol.

In an embodiment, inspecting the plurality of packets may comprise inspecting a packet to determine whether an ECN header of the packet indicates congestion on the network that carried the packet. In an example, a streaming video application may be running on wireless device 302, and the packets associated with the application may comprise packets transmitted from a streaming video server to the streaming video application. In this example, inspecting packets associated with the application running on wireless device 302 may comprise inspecting packets transmitted to the application (e.g., from the streaming video server) to determine whether an ECN header of the packet indicates congestion on the network that carried the packet At step 408, a bias factor may be calculated based on the marked packets received at the access node associated with the application. For example, a bias factor may be calculated based on the marked packets received at access node 304 associated with (e.g., transmitted to) the application (e.g., the streaming video application) running on wireless device 302. In an embodiment, the bias factor may comprise an additional factor for the delay based scheduler that considers delay for a packet prior to arrival at the access node. In an embodiment, where no marked packets associated with the application are received at the access node, the bias factor may comprise a default value (e.g., zero), and where at least one marked packet is received at the access node, the bias factor may be increased from the default value.

In an embodiment, the bias factor may be directly proportional to the number of marked packets associated with the application received at access node 304. For example, a number of marked packets associated with the application received at access node 304 within a period of time may be determined. The bias factor may increase as additional marked packets associated with the application are received at access node 304 within the period of time (e.g., predetermined period of time). The period of time may comprise one minute, five minutes, ten minutes, fifteen minutes, an hour, hours, and any other suitable time period. In an embodiment, the bias factor may be reduced when a marked packet associated with the application has not been received within a threshold time (e.g., the predetermined period of time).

In an embodiment, the bias factor may be based on wireless device feedback. For example, the application (e.g., streaming video application) may receive transmissions (e.g., physical resource blocks) from access node 304 using delay based scheduling. In this example, where the physical resource blocks comprise information from a packet that has exceeded the packet delay budget for the packet, the data from the packet may no longer be useful to the application (e.g., may be stale). Where access node 304 has transmitted stale data to the application, the wireless device 302 (e.g., the application running on the wireless device) may transmit feedback to the access node (e.g., feedback associated with the stale transmissions). In an embodiment, based on the feedback from the application, access node 304 may adjust the bias factor. For example, access node 304 may increase the bias factor.

At step 410, a remaining time may be calculated for the first packet based on a packet delay budget associated with the running application and the determination that one or more of the packets associated with the application are marked. For example, a packet delay budget may be associated with the application running on wireless device 302. A remaining time may be calculated for the first packet based on the packet delay budget associated with the application and the determination that one or more of the packets associated with the application were marked (e.g., marked indicating network congestion over the network that carried the one or more packets).

In an embodiment, a remaining time may be calculated for the first packet based on the packet delay budget associated with the application, the determination that one or more of the packets associated with the application are marked, and an estimated delay for transmission from access node 304 to wireless device 302. For example, a delay for transmission from access node 304 to wireless device 302 may be estimated. The estimated delay may be based on a determined distance between access node 304 and wireless device 302, a channel quality indicator (CQI) for wireless device 302, and any other suitable factor. A distance between access node 304 and wireless device 302 may be determined based on a Timing Advance (TA) for wireless device 302 when communicating with access node 304. In an embodiment, calculating the remaining time for the first packet may comprise summing the estimated delay for transmission from access node 304 to wireless device 302 and the calculated bias factor, and subtracting the sum from the packet delay budget associated with the application (e.g., the video streaming application).

In an embodiment, the remaining time for a packet ($d_i(t)$), may be calculated as shown: $d_i(t)=T_i-W_{i,t}-BF_{t,n}$ where $T_i$ may comprise the packet delay budget for packet "i," $W_{i,t}$ may comprise the packet delay for the packet "i" at time "t," and $BF_{t,n}$ may comprise the bias factor calculated as a function of number of marked packets, "n," associated with the application received at access node 304 (within a time period) at time "t." The packet delay budget may be based on the application running on wireless device 302. Real time applications (e.g., streaming video and voice applications) may comprise a smaller packet delay budget than non-real time applications (e.g., web browsers). The packet delay for the packet at time "t" may be based on the time stamp for the packet and the current time. For example, the packet delay may comprise the difference between the current time and the time stamp for the packet. The bias factor may be calculated as described herein.

At step 412, the first packet may be scheduled for transmission to the wireless device based on the calculated time remaining. For example, the first packet may be scheduled for transmission from access node 304 to wireless device 302 based on the calculated time remaining for the first packet. The scheduled transmission for the first packet may comprise one or more physical resource blocks scheduled for transmission. Access node 304 may schedule transmissions using a delay based scheduler.

In an embodiment, a wireless device with the lowest calculated $d_i(t)$ may be scheduled the next transmission by access node 304. For example, access node 304 may communicate with a plurality of wireless devices. Packets transmitted to the plurality of wireless devices may be received at access node 304. A $d_i(t)$ may be calculated for each of the packets, and the packet with the lowest calculated $d_i(t)$ may be scheduled for transmission to the wireless device associated with the packet. In an embodiment, when the first packet comprises the lowest calculated $d_i(t)$, the first packet may be scheduled for transmission to wireless device 302.

In an embodiment, when the calculated $d_i(t)$ for a packet is less than or equal to a lower bound threshold (or zero), the packet may be dropped by access node 304. In this example, where the time remaining for the packet is less than the lower bound threshold, it may be determined that the packet will exceed the packet delay budget for the packet if transmitted by access node 304 to the associated wireless device for the packet. Accordingly, the packet may be dropped by access node 304.

Although the methods described perform steps in a particular order for purposes of illustration, the methods discussed herein are not limited to any particular order or arrangement. One skilled in the art, using the disclosure provided herein, will appreciate that various steps of the methods can be omitted, rearranged, combined, and/or adapted in various ways.

Figure 5:
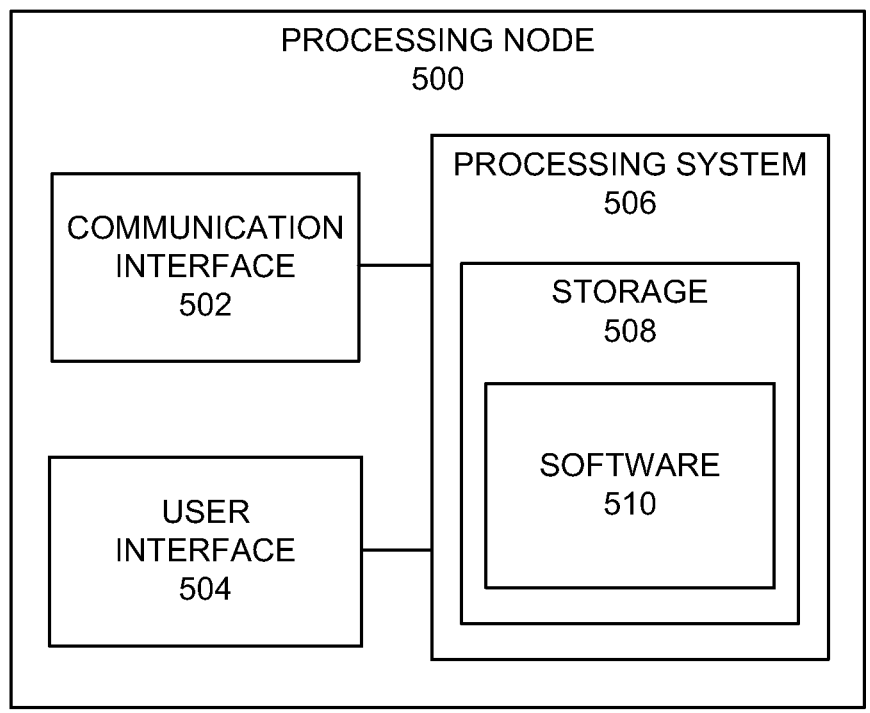
FIG. 5 illustrates an exemplary processing node.

FIG. 5 illustrates an exemplary processing node 500 in a communication system. Processing node 500 comprises communication interface 502, user interface 504, and processing system 506 in communication with communication interface 502 and user interface 504. Processing node 500 can be configured to determine a communication access node for a wireless device. Processing system 506 includes storage 508, which can comprise a disk drive, flash drive, memory circuitry, or other memory device. Storage 508 can store software 510 which is used in the operation of the processing node 500. Storage 508 may include a disk drive, flash drive, data storage circuitry, or some other memory apparatus. Software 510 may include computer programs, firmware, or some other form of machine-readable instructions, including an operating system, utilities, drivers, network interfaces, applications, or some other type of software. Processing system 506 may include a microprocessor and other circuitry to retrieve and execute software 510 from storage 508. Processing node 500 may further include other components such as a power management unit, a control interface unit, etc., which are omitted for clarity. Communication interface 502 permits processing node 500 to communicate with other network elements. User interface 504 permits the configuration and control of the operation of processing node 500.

Examples of processing node 500 include controller node 308 and gateway node 310. Processing node 500 can also be an adjunct or component of a network element, such as an element of access nodes 104 or 304 and the like. Processing node 500 can also be another network element in a communication system. Further, the functionality of processing node 500 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method for configuring a delay based scheduler for an access node, the method comprising:
    receiving, at an access node, a plurality of packets, wherein at least a first packet is associated with an application running on a wireless device in communication with the access node;
    inspecting the plurality of packets to determine that one or more of the packets associated with the application are marked, wherein the mark indicates network congestion;
    determining a number of marked packets associated with the application received at the access node within a time period;
    calculating a remaining time for the first packet based on a packet delay budget associated with the running application, a bias factor that is calculated based on the determined number of marked packets received at the access node, and an estimated delay for transmission from the access node to the wireless device, wherein the bias factor is subtracted from the remaining time for the first packet in response to the received number of marked packets associated with the application; and
    scheduling, using a delay based scheduler, the first packet for transmission based on the calculated time remaining, and transmitting the first packet to the wireless device based on the scheduling.

2. The method of claim 1, wherein calculating the remaining time for the first packet comprises summing the estimated delay for transmission from the access node to the wireless device and the bias factor, and subtracting the sum from the packet delay budget associated with the running application.

3. The method of claim 2, wherein scheduling, using a delay based scheduler, the first packet for transmission to the wireless devices based on the calculated time remaining further comprises:
    dropping the first packet when the sum of the estimated delay for transmission from the access node to the wireless device and the bias factor is greater than the packet delay budget associated with the running application.

4. The method of claim 1, wherein the calculated bias factor is directly proportional to the number of marked packets associated with the application received within the time period.

5. The method of claim 4, wherein the calculated bias factor is reduced when a marked packet associated with the application has not been received within a threshold time.

6. The method of claim 2, further comprising:
    time stamping each packet received at the access node; and
    scheduling, using the delay based scheduler, the first packet for transmission to the wireless device based on the time stamp for the first packet.

7. The method of claim 2, wherein the running application communicates using a real-time transport control protocol (RTCP) and a marked packet comprises an explicit congestion notification (ECN) mark.

8. A system for configuring a delay based scheduler for an access node, the system comprising:
    a processing node with a processor configured to:
    receive, at an access node, a plurality of packets, wherein at least a first packet is associated with an application running on a wireless device in communication with the access node;
    inspect the plurality of packets to determine that one or more of the packets associated with the application are marked, wherein the mark indicates network congestion;
    calculate a remaining time for the first packet based on a packet delay budget associated with the running application, a bias factor that is calculated based on a number of marked packets received at the access node, and an estimated delay for transmission from the access node to the wireless device, wherein the bias factor is subtracted from the remaining time for the first packet in response to the one or more marked packets associated with the application; and
    schedule, using a delay based scheduler, the first packet for transmission based on the calculated time remaining, and transmit the first packet to the wireless device based on the schedule.

9. The system of claim 8, wherein calculating the remaining time for the first packet comprises summing the estimated delay for transmission from the access node to the wireless device and the bias factor, and subtracting the sum from the packet delay budget associated with the running application.

10. The system of claim 9, wherein scheduling, using a delay based scheduler, the first packet for transmission to the wireless devices based on the calculated time remaining further comprises:
   dropping the first packet when the sum of the estimated delay for transmission from the access node to the wireless device and the bias factor is greater than the packet delay budget associated with the running application.

11. The system of claim 8, wherein the calculated bias factor is directly proportional to the number of marked packets associated with the application received within the time period.

12. The system of claim 11, wherein the calculated bias factor is reduced when a marked packet associated with the application has not been received within a threshold time.

13. The system of claim 9, wherein the processing node is further configured to: time stamp each packet received at the access node; and
   schedule, using the delay based scheduler, the first packet for transmission to the wireless device based on the time stamp for the first packet.

14. The system of claim 9, wherein the running application communicates using a real-time transport control protocol (RTCP) and a marked packet comprises an explicit congestion notification (ECN) mark.

* * * * *